United States Patent
Wilks

(10) Patent No.: US 7,266,678 B2
(45) Date of Patent: Sep. 4, 2007

(54) DYNAMIC CONFIGURATION OF COMPUTER WHEN BOOTING

(75) Inventor: Andrew W. Wilks, Austin, TX (US)

(73) Assignee: Dell Products L.P., Round Rock, TX (US)

(*) Notice: Subject to any disclaimer, the term of this patent is extended or adjusted under 35 U.S.C. 154(b) by 767 days.

(21) Appl. No.: 09/993,532

(22) Filed: Nov. 6, 2001

(65) Prior Publication Data

US 2003/0088653 A1 May 8, 2003

(51) Int. Cl.
G06F 9/445 (2006.01)
G06F 9/24 (2006.01)
G06F 15/177 (2006.01)
G06F 15/173 (2006.01)

(52) U.S. Cl. .................. 713/2; 709/226; 709/222
(58) Field of Classification Search ........ 709/220–222, 709/226; 713/1–2
See application file for complete search history.

(56) References Cited

U.S. PATENT DOCUMENTS

| | | | |
|---|---|---|---|
| 5,099,516 A | 3/1992 | Durkin et al. | |
| 5,581,740 A | 12/1996 | Jones | |
| 5,594,873 A | 1/1997 | Garrett | |
| 5,745,568 A | 4/1998 | O'Connor et al. | |
| 6,182,212 B1* | 1/2001 | Atkins et al. | 713/1 |
| 6,321,262 B1 | 11/2001 | Springer | |
| 6,442,685 B1* | 8/2002 | French et al. | 713/100 |
| 6,449,212 B1* | 9/2002 | Toda et al. | 365/233 |
| 6,449,642 B2* | 9/2002 | Bourke-Dunphy et al. | 709/222 |

OTHER PUBLICATIONS http://www.windowsnetworking.com/kbase/WindowsTips/WindowsXP / AdminTips /Miscellaneous/WindowsProgramStartupLocations.html. 2005, TechGenix Ltd.*
Farzad Khosrowpour, *Original Equipment Manufacturer Identification for Configurable Electronic Hardware*, filed Jan. 21, 1997, U.S. Appl. No. 08/786,007.
Jon Boede and Robert Tuttle, *Built-In Automatic Customer Identifier When Connecting to a Vendor Website*, filed Oct. 29, 1998, U.S. Appl. No. 09/182,403.
Cynthia M. Merkin, *Computer Information Access Based on a Transmitted Identification Signal*, filed Nov. 4, 1999, U.S. Appl. No. 09/434,770.

* cited by examiner

*Primary Examiner*—David Wiley
*Assistant Examiner*—Ji-Yong D. Chung
(74) *Attorney, Agent, or Firm*—Haynes and Boone, LLP

(57) ABSTRACT

A system and method for configuring a unique computer name record for an information handling system included in a network of a plurality of information handling systems. The method and system for dynamically generating a unique computer name for each information handling system that is connected to a network of information handling systems includes reading a service tag identifier that uniquely identifies the information handling system, incorporating at least a portion of the service tag identifier to define the unique computer name record; and using a substantially similar boot program to boot the information handling system and the plurality of information handling systems.

15 Claims, 3 Drawing Sheets

DYNAMIC CONFIGURATION OF COMPUTER WHEN BOOTING

BACKGROUND

The present disclosure relates to computer systems. More specifically, the present disclosure relates to dynamically generating a unique computer name for each computer system that is connected to a network of computer systems.

DESCRIPTION OF THE RELATED ART

Information systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

A computer system, which is one common type of information handling system, may be designed to give independent computing power to one or a plurality of users. Computer systems may be found in many forms including, for example, mainframes, minicomputers, workstations, servers, clients, personal computers, Internet terminals, notebooks, personal digital assistants, and embedded systems.

A computer system may be available as a desktop, floor-standing unit, or as a portable unit. The computer system typically includes a microcomputer unit having a central processing unit ("CPU" or a "processor"), volatile and/or non-volatile memory, a display monitor, a keyboard, one or more floppy diskette drives, a hard disk storage device, an optional DVD or CD-ROM drive, and an optional printer. A computer system also includes an operating system, such as Microsoft Windows XP™ or Linux. A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These I/O devices are typically plugged into connectors of computer system I/O interfaces such as serial interfaces and parallel interfaces, for example. Generally, these computer systems use a system board or motherboard to electrically interconnect these devices.

Computer systems also typically include basic input/output system ("BIOS") programs to ease programmer/user interaction with the computer system devices. More specifically, BIOS provides a software interface between the system hardware and the operating system/application program. The operating system ("OS") and application program typically access BIOS rather than directly manipulating I/O ports, registers, and control words of the specific system hardware. Well known device drivers and interrupt handlers access BIOS to, for example, facilitate I/O data transfer between peripheral devices and the OS, application program, and data storage elements. BIOS is accessed through an interface of software interrupts and contains a plurality of entry points corresponding respectively to the different interrupts. In operation, BIOS is typically loaded from a BIOS ROM or BIOS EPROM, where it is nonvolatily stored, to main memory from which it is executed. This practice is referred to as "shadowing" or "shadow RAM" and increases the speed at which BIOS executes.

Although the processor provides the "kernel" of the computer system, I/O communication between an I/O device and the processor forms a basic feature of computer systems. Many I/O devices include specialized hardware working in conjunction with OS specific device drivers and BIOS routines to perform functions such as information transfer between the processor and external devices, such as modems and printers, coupled to I/O devices.

The personal computer business is rapidly moving toward "build-to-order" manufacturing. The customer typically enters a purchase order for a computer system by selecting specific options such as processor model/speed, memory size, hard disk size, peripheral devices such as CRT monitor size, resolution, keyboard, CD-RW, DVD, printers and others. The computer system purchase order usually includes the choice for an operating system such as Windows ME™, Windows NT™, Windows 2000™ or in some cases Linux. The computer system manufacturer assembles the computer system hardware in compliance with the purchase order.

To load the selected operating system on to the hard disk for the first time, the PC manufacturer typically uses a boot device to initially boot up the PC. A boot device may typically include a floppy disk or a CD-ROM. The PC manufacturer typically generates a bootable CD-ROM from a master CD-ROM. The master CD-ROM typically includes a system image of a master computer system used to create the master CD-ROM. Thus the boot image on the master CD is static and is determined at the time the master CD is created. Multiple copies of the master CD are made and are generally included in the computer system as a bootable CD-ROM. Once a computer system's master boot CD is generated, the PC manufacturer deploys the operating system by using the bootable CD to load the operating system on other computer systems. Each type of operating system selected, e.g., Windows NT™, Windows XP™ or Linux may have its own bootable CD.

After completion of the hardware and software assembly process, the computer system undergoes extensive testing. The PC manufacturer typically ships the custom manufactured computer system within a few days to the customer after receipt of purchase order. Typically a PC manufacturer may ship several thousand "build-to-order" computer systems every day.

Information handling systems typically operate within a computer network. The computer network typically includes other information handling systems, which may vary in size and functionality from a PC to a mainframe computer. Some computer networks may be homogenous, e.g., include substantially similar information handling systems. For information handling systems that operate within a computer network environment, the boot up process typically involves activating the networking components of the information handling system. In order for the information handling system to operate within the computer network, the information handling system is typically identified by a unique computer name. An example of a typical name assigned to a information handling system is: "DELL_LAT_SERV_

10". A database record, which includes the unique computer name, is created and written to the name registry of the information handling system, e.g., Windows NT registry. Two computers residing on the same computer network and having a duplicate computer name typically result in a network conflict. The computer network management software generally prevents a second computer from attempting to use an earlier registered computer name. The computer network conflict situation may be resolved by changing the computer name of the offending computer to any unique name within the network.

Referring to FIG. 1 (PRIOR ART), a flow chart for a conventional method of booting a network enabled information handling system from a bootable CD is illustrated. In step 100, a information handling system is booted up from a boot CD. The PC manufacturer typically duplicates a master CD to create the boot CD. The master CD includes an image of the master information handling system, which was used to create the master CD. When the master CD is created, the master information handling system name, security identifier ("SID") and machine account information are included within the image file.

In step 120, the network components are enabled and the information handling system's name is read from the name registry. The name registry typically stores the information handling system name in the information handling system memory. In step 130, the information handling system name read from the name registry is broadcast on the information handling network to check for any conflicts. In step 140, a determination is made if the information handling system name is unique within the information handling network. In step 150, if no information handling name conflict exists then the boot phase of the information handling system proceeds and the information handling system is recognized as a valid node on the information handling network. By the end of the boot phase the PC's operating system and the network components would have been loaded. The information handling system is ready to perform assigned functions using the operating system and the information handling network. In step 160, if a information handling name conflict exists, e.g., happens when the same information handling system name exists on the information handling network, then the boot phase of the information handling system proceeds without enabling access to the information handling network. By the end of the boot phase the PC's operating system would have been loaded. However, the networking components would have not been enabled. The information handling system is ready to perform assigned functions using the operating system but not the information handling network.

When the boot CD image is restored on other information handling systems, they will all have the same information system handling name and security identifier. Thus, the first information handling system added on to a information handling network would boot up successfully as identified in step 150. However, since the operating system and the network management system typically requires that the information handling system name and security identifiers be unique for each target information handling system, subsequent additions of other information handling systems booted by using the same or substantially similar boot CD will generally fail to connect to the network. This is due to the fact that subsequently added information handling systems, having the same name as the first information handling system, causes network conflicts when the subsequently added PC stations are attached to the same information handling network, as described in step 160. Additionally, having duplicate machine account information may break the trust relationship between the information handling system and the domain definition.

If the operating system is loaded and the networking system components failed to get installed on the information handling system, then as an option a manual process may be utilized to configure and install the network components. The information handling system name is typically assigned by a information handling system user or a network administrator during the manual installation of the networking components. The information handling system user or a network administrator may define the information handling system name through an interactive dialog session on the display screen of the information handling system. Thus, by using the conventional method described in FIG. 1, the information handling system user or a network administrator is typically required to define the information handling system name for each of the several thousand information handling systems included in a corporate information handling network.

SUMMARY OF THE INVENTION

In accordance with the present disclosure, a method of dynamically generating a unique information handling system name for each information handling system that is connected to a network of information handling systems and a system thereof is described.

In one embodiment, the method includes reading a service tag identifier that uniquely identifies the information handling system, incorporating at least a portion of the service tag identifier to define the unique information handling system name record; and using a substantially similar boot program to boot the information handling system and a plurality of information handling systems included in the network of information handling systems. In one embodiment, configuration of the unique information handling system name record occurs prior to the information handling system accessing the information handling network.

In one embodiment, the information handling system, included in the network of information handling systems, includes a processor, and a memory coupled to the processor. The network is coupled to the processor and the memory. The information handling system and the plurality of information handling systems included in the network use a substantially similar boot program to boot up the system. The information handling system also includes a program that is stored in the memory. The program is enabled to read a service tag identifier uniquely identifying the information handling system and incorporate at least a portion of the service tag identifier to define the unique information handling system name record.

In one embodiment, an information handling-readable medium includes a computer program that is accessible therefrom. The program includes instructions for reading a service tag identifier uniquely identifying a information handling system and incorporating at least a portion of the service tag identifier to define a unique information handling system name record. The information handling system is coupled to an information handling network that includes a plurality of information handling systems. The information handling system and the plurality of information handling systems use a substantially similar boot program.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

For a thorough understanding of the subject disclosure, including the best mode contemplated by the inventor, reference may be had to the following Detailed Description, including the appended claims, in connection with the above-described Drawings. The following Detailed Description is intended to be illustrative only and not limiting.

Figure 2:
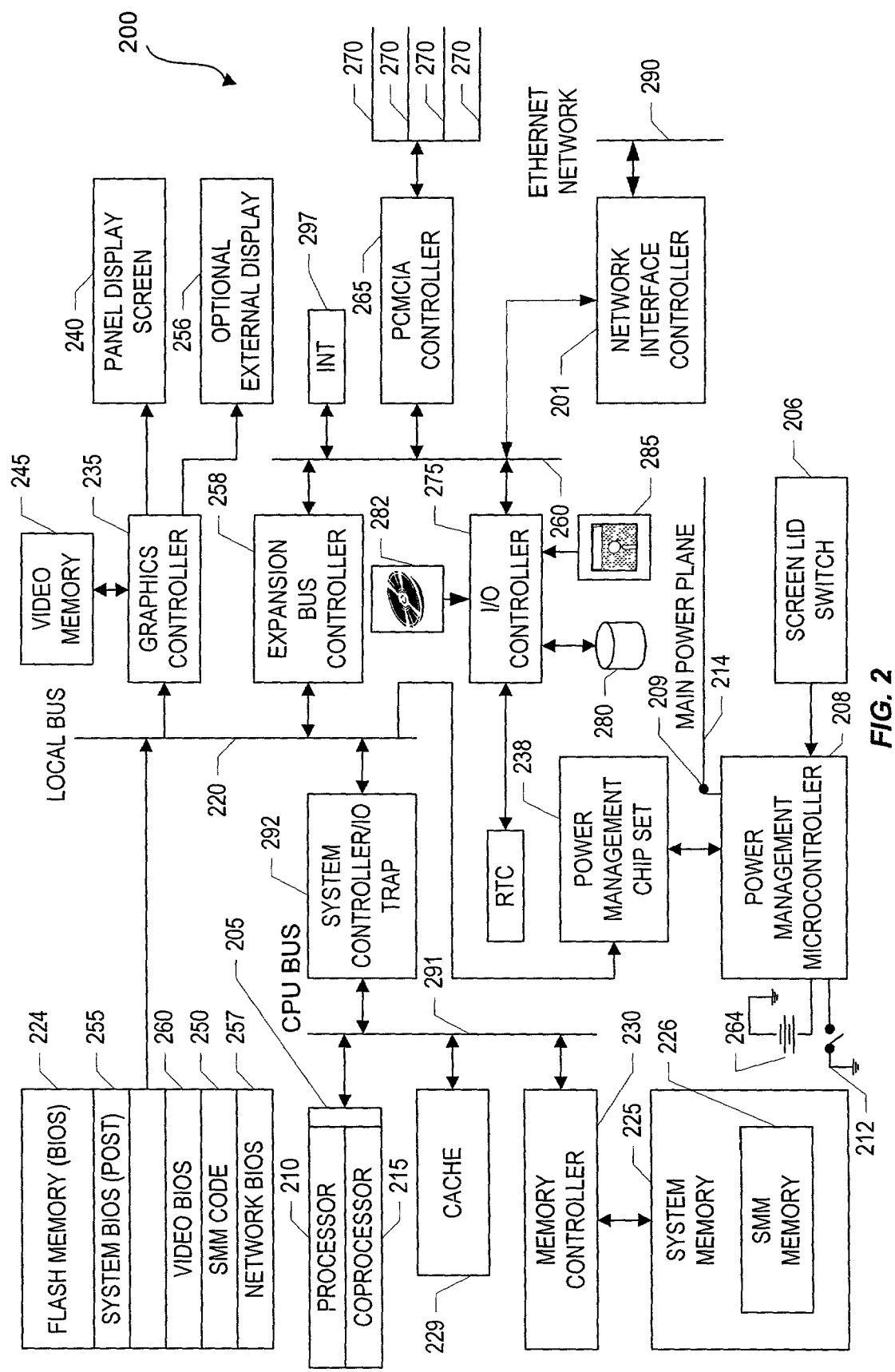
FIG. 2 illustrates an information handling system having a method for dynamically generating a unique information handling system name in accordance with the present disclosure.

Referring to FIG. 2, an information handling system 200 is shown that is suitable for implementing a method for dynamically generating a unique information handling system name in accordance with the present disclosure. In one embodiment, the information handling system 200 is a computer system.

Information handling system 200 includes a processor 205, for example, an Intel Pentium™ class microprocessor. The processor 205 may include a central processing unit ("CPU") and a coprocessor 215 for handling floating point operations. Processor 205 is coupled to cache 229 and memory controller 230 via processor bus 291. System controller I/O trap 292 couples processor bus 291 to local bus 220 and is generally characterized as part of a system controller such as a Pico Power Vesuvious or an Intel™ Mobile Triton chip set. System controller I/O trap 292 can be programmed in a well-known manner to intercept a particular target address or address range, and, upon intercepting a target address, system controller I/O trap 292 asserts an intercept signal indicating that processor 205 attempted to access the target address.

A main memory 225 of dynamic random access memory ("DRAM") modules is coupled to local bus 220 by a memory controller 230. Main memory 225 includes a system management mode memory area which is employed to store converter code to implement conversion methodology embodiments as will be discussed in more detail subsequently.

In its simplest form an information handling system may include the processor 205 and the memory 225. The processor 205 is typically enabled to execute instructions stored in the memory 225. The executed instructions typically perform a function. Information handling systems may vary in size, shape, performance, functionality and price. Examples of a information handling systems may include everything from a pager to a mainframe computer.

A (BIOS) memory 224 is coupled to local bus 220. A FLASH memory or other nonvolatile memory is used as BIOS memory 224. A BIOS program (not shown) is usually stored in the BIOS memory 224. The BIOS program includes software for interaction with the information handling system boot devices such as the keyboard, the mouse, or a CD-ROM 182. The BIOS memory 224 stores the system code which controls some information handling system 200 operations.

A graphics controller 235 is coupled to local bus 220 and to a panel display screen 240. Graphics controller 235 is also coupled to a video memory 245 which stores information to be displayed on panel display 240. Panel display 240 is typically an active matrix or passive matrix liquid crystal display ("LCD") although other display technologies may be used as well. Graphics controller 235 can also be coupled to an optional external display or standalone monitor display 256 as shown in FIG. 5. One graphics controller that can be employed as graphics controller 235 is the Western Digital WD90C24A graphics controller.

A bus interface controller or expansion bus controller 258 couples local bus 220 to an expansion bus 260. In this particular embodiment, expansion bus 260 is an Industry Standard Architecture ("ISA") bus although other buses, for example, a Peripheral Component Interconnect ("PCI") bus, could also be used. A personal computer memory card international association ("PCMCIA") controller 265 is also coupled to expansion bus 260 as shown. PCMCIA controller 265 is coupled to a plurality of expansion slots 270 to receive PCMCIA expansion cards such as modems, fax cards, communications cards, and other input/output devices. Interrupt request generator 297 is also coupled to ISA bus 260 and issues an interrupt service request over a predetermined interrupt request line after receiving a request to issue interrupt instruction from processor 205.

An I/O controller 275, often referred to as a super I/O controller is coupled to ISA bus 260. I/O controller 275 interfaces to an integrated drive electronics ("IDE") hard drive 280, a CD-ROM drive 282 and a floppy drive 285. A network interface controller 201 enables the information handling system 200 to communicate with a computer network such as an Ethernet 290. The computer network may include a network such as a local area network ("LAN"), wide area network ("WAN"), Internet, Intranet, wireless broadband or the like. The network interface controller 201 forms a network interface for communicating with other information handling systems (not shown) connected to the Ethernet 290 for implementing a method of dynamically generating a unique computer name for each information handling system that is connected to the network of other information handling systems. The information handling system's networking components generally include hardware as well as software components. Examples of the hardware components include the network interface controller 201 and the Ethernet 290. Examples of the software components, which include messaging services and network administration services, are described below.

The information handling system 200 serves as a controller for resolving proprietary and standard event and message structures into a common format for use by the computer network for many management purposes. The information handling system 200 is connected with a plurality of computer systems in the network for receiving messages from the computer systems, analyzing the messages and determine an effective utilization of the messages as directed by a user or network administrator. The information handling system 200 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. The information handling system 200 supports the conversion of messages into the common format to facilitate particular network applications.

Information handling system 200 includes a power supply 264, for example, a battery, which provides power to the many devices which form information handling system 200. Power supply 264 is typically a rechargeable battery, such as a nickel metal hydride ("NiMH") or lithium ion battery, when information handling system 200 is embodied as a portable or notebook computer. Power supply 264 is coupled to a power management microcontroller 208 which controls the distribution of power from power supply 264. More specifically, microcontroller 208 includes a power output 209 coupled to the main power plane 214 which supplies power to processor 205. Power microcontroller 208 is also coupled to a power plane (not shown) which supplies power to panel display 240. In this particular embodiment, power control microcontroller 208 is a Motorola 6805 microcontroller. Microcontroller 208 monitors the charge level of power supply 264 to determine when to charge and when not to charge battery 264. Microcontroller 208 is coupled to a main power switch 212 which the user actuates to turn the information handling system 200 on and off.

While microcontroller 208 powers down other portions of information handling system 200 such as hard drive 280 when not in use to conserve power, microcontroller 208 itself is always coupled to a source of energy, namely power supply 264.

The information handling system 200 may be configured as a server. The information handling system 200, in a sever embodiment, provides a service to other information handling systems connected to it via a network, e.g., Ethernet 290. In a portable embodiment, information handling system 200 also includes a screen lid switch 206 or indicator 206 which provides an indication of when panel display 240 is in the open position and an indication of when panel display 240 is in the closed position. It is noted that panel display 240 is generally located in the same location in the lid of the computer as is typical for "clamshell" types of portable computers such as laptop or notebook computers. In this manner, the display screen forms an integral part of the lid of the computer which swings from an open position for interaction with the user to a close position.

Information handling system 200 also includes a power management chip set 238, which includes power management chip models PT86C521 and PT86C522 manufactured by Pico Power. Power management chip set 238 is coupled to processor 205 via local bus 220 so that power management chip set 238 can receive power control commands from processor 205. Power management chip set 238 is connected to a plurality of individual power planes which supply power to respective devices in information handling system 200 such as hard drive 280 and floppy drive 285, for example. In this manner, power management chip set 238 acts under the direction of processor 205 to control the power to the various power planes and devices of the computer. A real time clock ("RTC") 240 is coupled to I/O controller 275 and power management chip set 238 such that time events or alarms can be transmitted to power management chip set 238. Real time clock 240 can be programmed to generate an alarm signal at a predetermined time.

When information handling system 200 is turned on or powered up, the information handling system 200 enters a start up phase, also referred to as a boot up phase, during which the information handling system hardware is detected and the operating system is loaded. In case of a information handling system 200 with the Windows NT operating system, the boot up process is typically divided into three stages. The initial two boot stages pertain to start up of the system components of the information handling system 200 and the 3rd stage typically pertains to the boot up of networking components of the information handling system 200.

During the initial two boot stages, the information handling system BIOS software stored in non-volatile BIOS memory 224 is copied into main memory 225 so that it can be executed more quickly. This technique is referred to as "shadowing" or "shadow RAM" as discussed above. At this time, system management mode ("SMM") code 250 is also copied into the system management mode memory area 226 of main memory 225. Processor 205 executes SMM code 250 after processor 205 receives a system management interrupt ("SMI") which causes the microprocessor to enter SMM. Additional conditions under which an SMI is generated are discussed subsequently. It is noted that along with SMM code 250, also stored in BIOS memory 224 and copied into main memory 225 at power up are system BIOS 255 (including a power on self test module-POST), network BIOS 257 and video BIOS 260. It will be recognized by those of ordinary skill in the art that other memory mapping schemes may be used. For example, SMM code 250 may be stored in fast SRAM memory (not shown) coupled to the local/processor bus 220.

The system BIOS 255 includes BIOS software configurable to load and perform a method of dynamically generating a unique computer name for each information handling system that is connected to a network of information handling systems as described in further detail below. The network boot up process typically pertains to connecting the information handling system 200 to a computer network such as an Ethernet 290. During the network boot process, which is typically the final stage of the boot up, the network BIOS 257 is configurable to load and execute the networking components.

In one embodiment, the information handling system 200 includes a computer-readable medium having a computer program or information handling system 200 software accessible therefrom, the computer program including instructions for performing the method of dynamically generating a unique computer name for each information handling system that is connected to a network of information handling systems. The computer-readable medium may typically include any of the following: a magnetic storage medium, including disk and tape storage medium; an optical storage medium, including optical disks such as CD-ROM, CD-RW, and DVD; a non-volatile memory storage medium; a volatile memory storage medium; and data transmission or communications medium including packets of electronic data, and electromagnetic or fiber optic waves modulated in accordance with the instructions.

Figure 3:
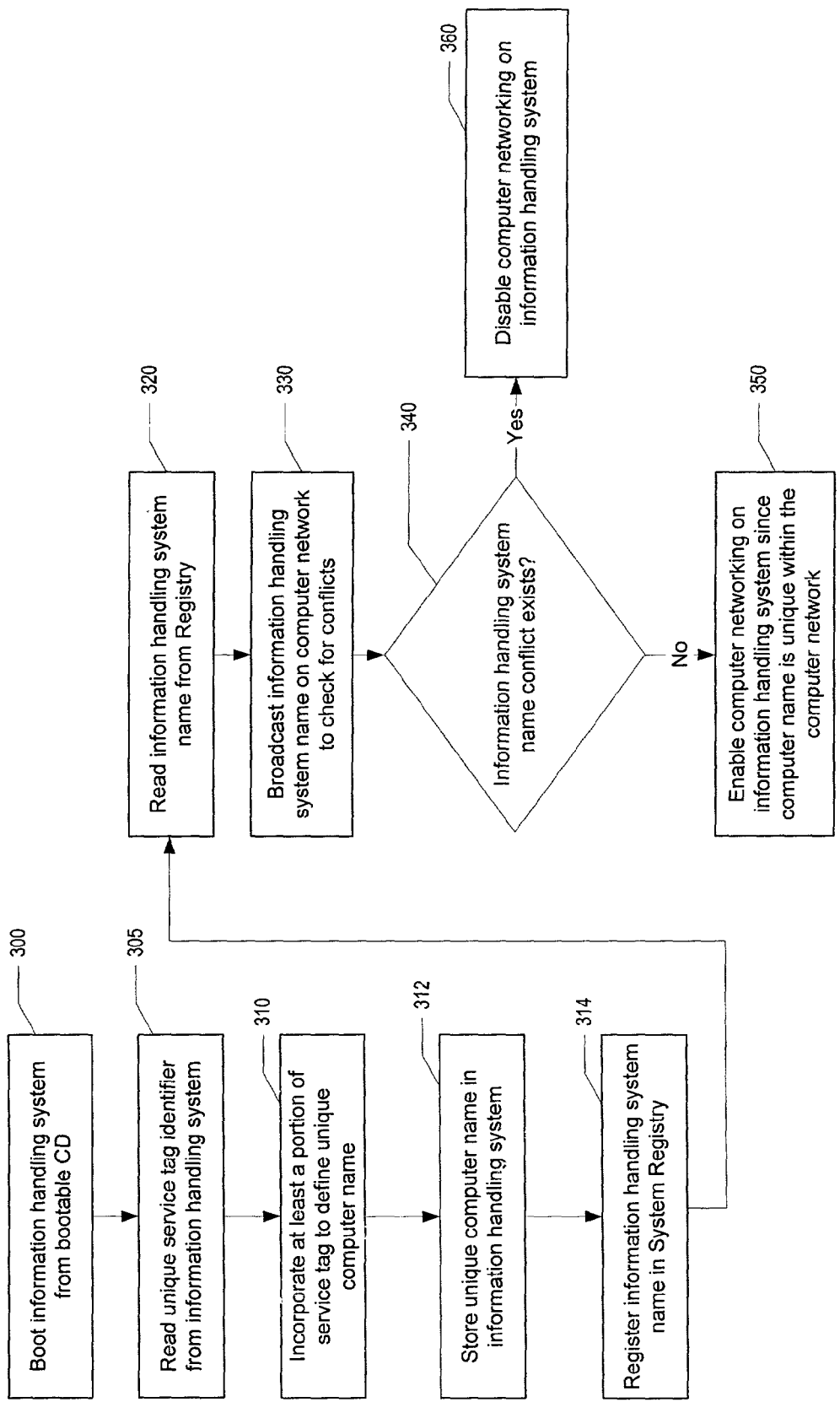
FIG. 3 shows a flow chart for a method of dynamically generating a unique information handling system name for the information handling system.

Referring to FIG. 3, a flow chart for a method of dynamically generating a unique computer name (also referred to as a unique information handling system name) for a information handling system that is connected to a network of information handling systems and using the unique computer name to boot the network enabled information handling system from a bootable CD is illustrated. In step 300, a information handling system 200 is booted up from a boot CD.

In step 305, a software program is enabled to be executed during the system stage, which is typically the 2nd stage, of the boot process and prior to the boot up of the networking components. In one embodiment, the software program may be implemented as a device driver program which is automatically loaded by system BIOS 255 and is scheduled to execute before the networking components are enabled. In one embodiment, a NameFix.sys device driver program is configured to read a service tag identifier uniquely identifying the information handling system 200.

The service tag identifier is typically generated by the manufacturer of the information handling system 200 to uniquely identify and track the product during the lifetime of the product. The service tag identifier may be compared to a vehicle identification number ("VIN") which is commonly used to identify and track automobiles. The service tag identifier is typically permanently stored as a unique serial identification number in the non-volatile portion of the information handling system 200 memory 225. The service tag identifier may also be stored as a record in a database. In one embodiment, the information handling system security identifier ("SID") may be configured to be the same as the service tag identifier.

In step 310, after reading the service tag identifier, the software program is configurable to incorporate at least a portion of the service tag identifier to define a unique computer name record. In one embodiment, the unique computer name record, e.g., "DELL_12233_123456789", is automatically and dynamically generated by the software program by incorporating a portion of the service tag identifier, e.g., "12233-DELL-0012233-123456789", into the computer name. In step 312, the software program is then configurable to store the unique computer name in memory 225. In step 314, the unique computer name is registered into the system registry. In effect, the software program is configurable to over write the earlier stored computer name stored in the registry, e.g., the computer name of the master computer, which was used to create the boot CD. The software program is enabled to perform the above described tasks including generating the unique computer name record, storing the record in memory and writing the computer name to the system registry prior to booting the networking components of the information handling system 200.

Figure 1:
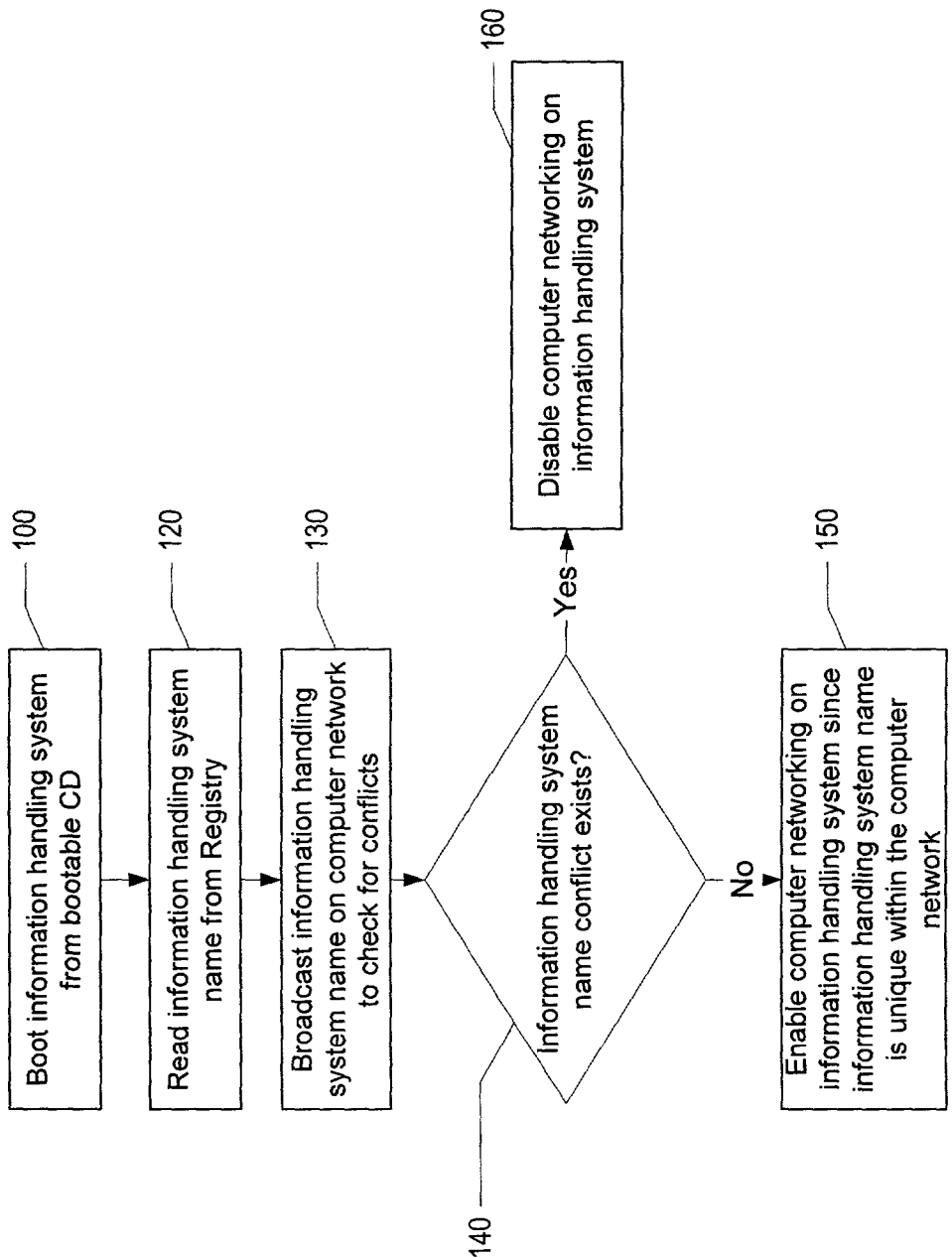
FIG. 1 (PRIOR ART) shows a flow chart for a conventional method of booting a network enabled information handling system from a bootable CD.

In step 320, the boot up sequence for the network components is initiated. The computer name registered in the information handling system 200 registry is read. In step 330, the computer name is broadcast on the computer network to check for conflicts. In step 340, a determination is made if the computer name is unique within the computer network. In step 360, if no computer name conflict exists then the boot phase of the information handling system proceeds and the information handling system is recognized as a valid node on the computer network. By the end of the boot phase the PC's operating system and the network components would have been loaded. The information handling system is ready to perform assigned functions using the operating system and the computer network. Unlike the conventional method described in FIG. 1, since a new computer name has been configured in step 305 and registered in the system registry in step 310, it is very likely that no name conflicts would arise in step 340. In step 350, if a computer name conflict exists, e.g., when the same computer name exists on the computer network, then the boot phase of the information handling system proceeds without enabling access to the computer network. It would be, however, very unlikely that the new unique computer name registered in the system registry in step 310 would match the name of a computer network resident existing information handling system. By the end of the boot phase the PC's operating system would have been loaded. However, the networking components would have not been enabled. The information handling system is ready to perform assigned functions using the operating system but not the computer network.

By automatically and dynamically configuring unique computer names during the boot up process but prior to the boot up of networking components, the method described in FIG. 3 may be advantageously used to efficiently load the operating system on thousands of information handling systems and automatically enable their networking option.

Although the method and system of the present disclosure has been described in connection with the preferred embodiment, it is not intended to be limited to the specific form set forth herein, but on the contrary, it is intended to cover such alternatives, modifications, and equivalents, as can be reasonably included within the spirit and scope of the disclosure as defined by the appended claims.

What is claimed is:

1. A method of configuring a unique computer name record for a primary information handling system included in a network of a plurality of information handling systems, the method comprising:
    reading a service tag identifier uniquely identifying the primary information handling system;
    incorporating at least a portion of the service tag identifier to define the unique computer name record;
    the primary information handling system and the plurality of information handling systems using a substantially similar boot program;
    storing the unique computer name record for the primary information handling system in a memory of the primary information handling system;
    transferring the unique computer name record to a name registry of the primary information handling system;
    booting the primary information handling system from the substantially similar boot program used by each of the plurality of information handling systems but prior to the boot up of the network of information handling systems;
    reading the name registry; and
    broadcasting the unique computer name record on the network to check for conflicts, and whereby if no conflict exists, the primary information handling system is recognized as a valid node on the network.

2. The method of claim 1, wherein each of the plurality of information handling systems is configured to have a corresponding unique computer name record using a service tag identifier of each of the plurality of information handling systems.

3. The method of claim 1, wherein the configuration of the unique computer name record occurs prior to the primary information handling system accessing the network.

4. The method of claim 1, wherein the configuration of the unique computer name record for the primary information handling system occurs dynamically during a startup of the primary information handling system.

5. The method of claim 1, wherein the transfer of the unique computer name record to the name registry occurs prior to the primary information handling system accessing the network.

6. A primary information handling system, included in a network of a plurality of information handling systems, comprising:

a processor;

a memory coupled to the processor;

the network coupled to the processor and the memory, wherein the primary information handling system and the plurality of information handling systems use a substantially similar boot program; and a program stored in the memory, wherein the program is enabled to:

read a service tag identifier uniquely identifying the primary information handling system;

incorporate at least a portion of the service tag identifier to define a unique name record;

permit the primary information handling system and a network of the plurality of information handling systems to use a substantially similar boot program;

store the unique name record for the primary information handling system in a memory of the primary information handling system;

transfer the unique name record to a name registry of the primary information handling system;

boot the primary information handling system from the substantially similar boot program used by each of the plurality of information handling systems but prior to the boot up of the network of information handling systems;

read the name registry; and broadcast the unique computer name record on the network to check for conflicts, and whereby if no conflict exists, the primary information handling system is recognized as a valid node on the network.

7. The system of claim 6, wherein each of the plurality of information handling systems is configured to have a corresponding unique name record using a service tag identifier of each of the plurality of information handling systems.

8. The system of claim 6, wherein the definition of the unique name record occurs prior to the primary information handling system accessing the information handling network.

9. The system of claim 6, wherein the definition of the unique name record for the primary information handling system occurs dynamically during a startup of the information handling system.

10. The system of claim 6, wherein the transfer of the unique name record to the name registry occurs prior to the primary information handling system accessing the information handling network.

11. A computer-readable medium having a computer program accessible therefrom, wherein the computer program comprises instructions for:

reading a service tag identifier uniquely identifying a primary information handling system;

incorporating at least a portion of the service tag identifier to define a unique computer name record;

permitting the primary information handling system and a network of a plurality of information handling systems to use a substantially similar boot program;

storing the unique computer name record for the primary information handling system in a memory of the primary information handling system;

transferring the unique computer name record to a name registry of the primary information handling system;

booting the primary information handling system from the substantially similar boot program used by each of the plurality of information handling systems but prior to the boot up of the network of a plurality of information handling systems;

reading the name registry; and broadcasting the unique computer name record on the network to check for conflicts, and whereby if no conflict exists, the primary information handling system is recognized as a valid node on the network.

12. The computer-readable medium of claim 11, wherein each of the plurality of information handling systems is configured to have a corresponding unique computer name record using a service tag identifier of each of the plurality of information handling systems.

13. The computer-readable medium of claim 11, wherein the definition of the unique computer name record occurs prior to the primary information handling system accessing the computer network.

14. The computer-readable medium of claim 11, wherein the definition of the unique computer name record for the primary information handling system occurs dynamically during a startup of the information handling system.

15. The computer-readable medium of claim 11, wherein the transfer of the unique computer name record to the name registry occurs prior to the primary information handling system accessing the computer network.

* * * * *